United States Patent [19]

Olarig et al.

[11] Patent Number: 6,032,257
[45] Date of Patent: Feb. 29, 2000

[54] HARDWARE THEFT-PROTECTION ARCHITECTURE

[75] Inventors: Sompong P. Olarig, Cypress; Michael F. Angelo, Houston; Kenneth A. Jansen, Spring, all of Tex.

[73] Assignee: Compaq Computer Corporation, Houston, Tex.

[21] Appl. No.: 08/927,114

[22] Filed: Aug. 29, 1997

[51] Int. Cl.[7] .............................. G06F 13/00; H04L 9/00
[52] U.S. Cl. ............................................ 713/200; 380/23
[58] Field of Search ................................... 713/200, 202, 713/201; 380/2, 4, 3, 23, 25, 28, 30, 43, 44, 48; 714/5, 21, 27, 30, 32, 33, 36, 37, 48, 712, 720, 732; 395/500.02, 500.05; 340/825.34; 235/382

[56] References Cited

U.S. PATENT DOCUMENTS

| | | | |
|---|---|---|---|
| 4,465,901 | 8/1984 | Best | 178/22.08 |
| 4,982,371 | 1/1991 | Bolan et al. | 365/228 |
| 5,010,331 | 4/1991 | Dias et al. | 340/825.31 |
| 5,058,161 | 10/1991 | Weiss | 380/23 |
| 5,120,939 | 6/1992 | Claus et al. | 235/382 |
| 5,226,137 | 7/1993 | Bolan et al. | 395/425 |
| 5,249,230 | 9/1993 | Mihm, Jr. | 380/23 |
| 5,267,311 | 11/1993 | Bakhoum | 380/4 |
| 5,353,350 | 10/1994 | Unsworth et al. | 380/3 |
| 5,367,148 | 11/1994 | Storch et al. | 235/375 |
| 5,375,243 | 12/1994 | Parzych et al. | 395/725 |
| 5,402,490 | 3/1995 | Mihm, Jr. | 380/21 |
| 5,481,611 | 1/1996 | Owens et al. | 380/25 |
| 5,506,991 | 4/1996 | Curry et al. | 395/800 |
| 5,517,015 | 5/1996 | Curry et al. | 235/492 |
| 5,530,431 | 6/1996 | Wingard | 340/568 |
| 5,537,540 | 7/1996 | Miller et al. | 395/183.14 |
| 5,546,463 | 8/1996 | Caputo et al. | 380/25 |
| 5,587,955 | 12/1996 | Lee et al. | 365/221 |
| 5,594,793 | 1/1997 | Bahout | 380/4 |
| 5,619,066 | 4/1997 | Curry et al. | 257/679 |
| 5,646,998 | 7/1997 | Stambler | 380/25 |
| 5,671,285 | 9/1997 | Newman | 380/30 |
| 5,677,952 | 10/1997 | Blakley, III et al. | 380/4 |
| 5,696,824 | 12/1997 | Walsh | 380/24 |
| 5,696,827 | 12/1997 | Brands | 380/30 |
| 5,715,174 | 2/1998 | Cotichini et al. | 364/514 R |
| 5,774,545 | 6/1998 | Raghavachari | 380/4 |
| 5,825,877 | 10/1998 | Dan et al. | 380/4 |
| 5,832,214 | 11/1998 | Kikinis | 395/188.01 |
| 5,832,228 | 11/1998 | Holden et al. | 395/200.55 |
| 5,838,251 | 11/1998 | Brinkmeyer et al. | 340/825.31 |
| 5,838,793 | 11/1998 | Lewis | 380/25 |

OTHER PUBLICATIONS

Jonathan Lambeth, IBM hands users a security lifeline. (put serial numbers on all memory products and processors) (company business and marketing), Computer Weekly, p1 (1), Feb. 1996.

Christian Damsgaard Jensen et al., Protection reconfiguration for reusable software, 1998 Proced. of the second Euromicro conference on, pp. 74–80, Jun. 1998.

Andrew Hiles, Surviving a computer disaster, Computing and control Engineering Journal, vol. 33, pp. 133–135, May 1992.

(List continued on next page.)

*Primary Examiner*—Robert W. Beausoliel, Jr.
*Assistant Examiner*—Nadeem Iqbal
*Attorney, Agent, or Firm*—Robert Groover

[57] ABSTRACT

A method of theft protection for computers and computer related hardware. Warranty fraud, theft of proprietary technology, and hardware theft are minimized by encoding the hardware components such that a digitally authenticated handshake must be performed between the system and the component at power-up. If the handshake is successful, normal operation continues with all enhancements. If the handshake is unsuccessful, the device is disabled or shifted into a lower performance mode.

29 Claims, 3 Drawing Sheets

OTHER PUBLICATIONS

U.S.Patent Application of Michael F. Angelo, "A Method For Controlling Access to A Computer System By Utilizing An External Device Containing A Hash Value Representation of a user Password", SN 08/777,621 filed Dec. 31, 1996, Docket P–1155.

Brown, Bruce "Stop, Thief!" Computer Shopper, May 1997, p. 232 & 233.

U.S.Patent Application SN 08/396,343, "Security Control For a Personal Computer", filed Mar. 3, 1995.

U.S. Application SN 08/632,892, "Secure Power Supply", filed Apr. 16, 1996, P–973.

U.S.Application SN 08/657,982, "Method and Apparatus for Providing Secure and Private Keyboard Communciations in Computer Systems", filed May 29, 1996, P–1016.

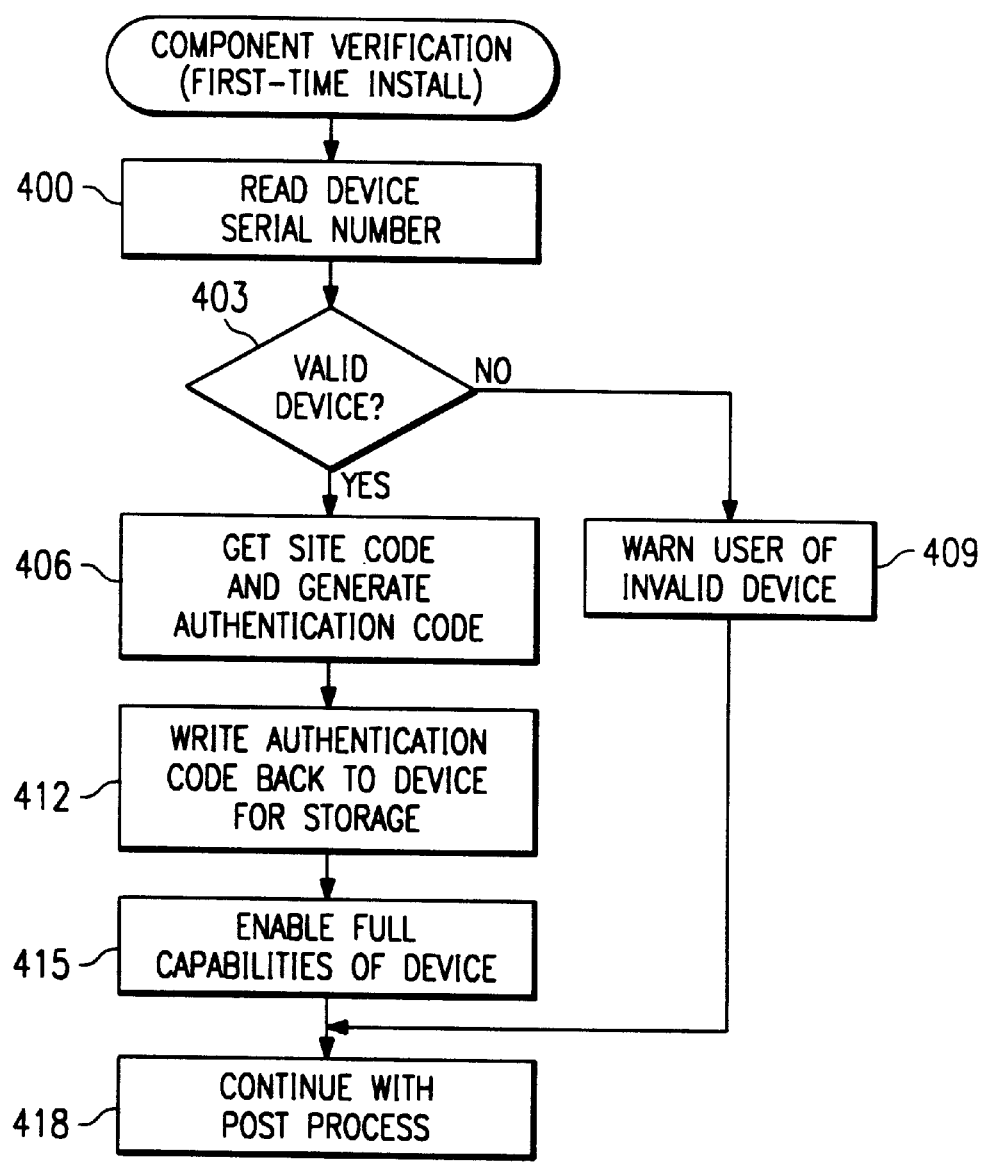

HARDWARE THEFT-PROTECTION ARCHITECTURE

BACKGROUND AND SUMMARY OF THE INVENTION

The present invention relates to a method of theft protection for computers and/or computer related hardware.

Background: Theft in the Computer "Clone" World

With the advent of a myriad of "clone" computer manufacturers, parts and component interchangeability have had a dramatic impact on businesses and consumers. Some level of standardization has been achieved with the basic components of computers. Competition in the marketplace has driven costs down for computers and peripherals as many vendors use the same or similar parts to package their systems. However, an unpleasant side effect of standardization is that stolen parts can easily be used in other systems. Employee theft of computer related equipment and parts is a major source of lost revenue for businesses, and will continue to rise unless businesses can employ a more secure method for reducing the value of gray-market computer components.

Theft of small high-dollar components is relatively easy and attractive. For example, the dollar value per cubic foot is high for such components as high-density memory modules, microprocessors, advanced graphics cards, and hard disks. The need for efficient manufacturing means that handling cannot be totally secure. Thus, losses due to theft are a persistent concern.

The increasing use of Plug-and-Play and hot-swapping component architectures have made component theft increasingly convenient for thieves.

Background: Systems and System Components

Prior art methods for reducing theft of systems and system components are limited in effectiveness and scope. The methods include the use of micro asset tags which identify the source of the hardware and in some cases, even the eventual owner. For example, Dallas Semiconductor has long offered electronic identification "tags." These are non-volatile memories in durable buttonsized packages, which can be read by a special low-data-rate serial bus, and can be used to store a component's serial number. However, they can be popped off a circuit board, and this means that they provide only a very limited degree of security against theft.

Another proposed anti-theft method was a hard drive password security system disclosed in U.S. Pat. No. 5,375,243, hereby incorporated by reference.

Still another method is the ATA Drive specification which provides a way to protect data at the controller level. (The ATA specification allows a lockout relationship, where the hard disk can be prevented from spinning up if the correct password value is not entered.)

The disadvantages of the prior art methods are that they,
were expensive, and/or
only worked with hard disks, and/or
didn't prevent someone from using the stolen equipment, and/or
had no mechanism for certifying the vendor of a product, which affects warranty fraud, and/or
devices were easy to duplicate and steal.

Background: Warranty Fraud

Another facet of on-going computer theft is warranty fraud. Normally when a failure occurs while under warranty, the end user sends the system back to the manufacturer for warranty repair, and the manufacturer then expends parts, labor, and shipping costs to remedy the problem. This is a normal cost of doing business. However, because of the generic design of many computer parts and subsequent use by numerous manufacturers, defective or used third-party parts may be inserted into a relatively new machine, reported as broken, and then sent to the manufacturer for warranty work, all at the manufacturer's expense. Control of this type of fraud would be very desirable.

Background: System Certification

As mentioned before, some level of standardization has been achieved in several areas of computing technology. One area, for example, is networking, where only a handful of major operating systems and architectures dominate the market. As consumers and businesses buy more computers and related products, they need to be assured that the systems they buy are compatible with standard network and operating system software. To provide this assurance, high-end manufacturer may give a certification that the system as manufactured is compatible with certain standards. Any incompatibility between original equipment manufacturer ("OEM") systems and the presently accepted standards is resolved at the manufacturer and not in the field.

Background: Technical Support Operations

An area involving increasing costs for both businesses and consumers is technical support via telephone support, internet access, etc. There was a time when this service was provided by the manufacturer for free. However, warranty fraud, among other economic pressures have made this less common. As a result, most companies have had to stop offering this service free to the consumer.

Background: Computer Start-Up

A computer system normally includes a number of complex hardware components (chips and subsystems). When power is first applied to a computer (or when the user triggers a reset after the system has locked up), the various hardware elements (chips and subsystems) will each have their own internal procedures (reset procedures) to regain a stable and known state. However, at some point (if the hardware is intact), these reset procedures will have ended, and the CPU initiates various important overhead tasks under software control. This phase of operation is generally referred to as "POST" (Power-On-Self-Test). The POST routines provide an extensive check for system integrity. These include, for example, surveying the system configuration, performing sanity checks on system hardware, issuing diagnostic signals (such as sounding beeps through a speaker or turning on LEDs), and permitting the user to branch into an NVRAM configuration program.

Background: Digital Signature Techniques

Digital signature techniques are used to provide message authentication. The sender, for example a software vendor or system administrator, uses his own private key to encrypt a "message digest," thereby 'signing' the message. A message digest is a cryptographically-strong one-way hash function. It is somewhat analogous to a "checksum" or CRC error checking code, in that it compactly represents the message and is used to detect changes in the message. Unlike a CRC, however, it is computationally infeasible for an attacker to devise a substitute message that would produce an identical message digest. The message digest gets encrypted by the sender's private key, creating a digital signal of the message. Various digital techniques have been proposed, such as SHA2 or CMD5.

The recipient can verify the digital signal by using the sender's public key to decrypt it. This proves that the sender was the true originator of the message, and that the message has not been subsequently altered by anyone else, because the sender alone possesses the private key that made that digital signal. Forgery of a signed message is infeasible, and the sender cannot later disavow his message.

Further background on digital signatures can be found, for example, in the following books, all of which are hereby incorporated by reference: Pfitzman, Digital Signature Schemes (1996); Grant, Understanding Digital Signature (1997).

A Methodology of Theft Protection For Hardware

The present application discloses a new method of theft protection for computers and computer related hardware (e.g. detachable peripherals). The protected peripherals each contain a digital authentication code which verifies both the device serial number and the site code of the system where it is located. (This authentication code is stored in nonvolatile and locked memory, so that the protection cannot easily be bypassed.) This authentication code is used for a digitally authenticated handshake, which must be performed between the system and the component at each power-up. If the handshake is successful, normal operation continues with all enhancements. If the handshake is unsuccessful, the device is disabled or shifted into a lower-performance mode.

In particular, vendor-specific hardware may be encoded such that the hardware will only operate with that specific vendor's systems, or only in the specific system in which the device was originally installed.

According to a class of innovative embodiments, the peripheral also includes a "signed" encoding of the serial number which uniquely identifies the manufacturer. (Because the encoding is digitally signed with a secret key generated by the manufacturer, the part is uniquely identified with that particular manufacturer.) When the system is returned for warranty work, the manufacturer can check whether the signed encoding verifies the serial number. If encoding protection is enabled and the code is invalid, warranty repair can be declined.

During normal operation, the user powers-up the system and the POST process executes. During the POST, the system rotates through all devices executing a handshaking scheme. Unless this is a first-time installation, each protected device will contain readable digital values for both: its own serial number; and an authentication code derived from its serial number in combination with the site code of the system or network where the protected device has been installed.

At power-up, the device requires the correct site code, as verified by its authentication code. (By using appropriate digital transformation techniques, a thief can be preventing from extracting the correct site code from the stored authentication code.)

When the user receives a new device from the OEM, the encoded password is not set. When the new device is installed and becomes active for the first time, it will automatically self-program an authentication code which depends on its own serial number and on the site code received from the system during the POST process. Thereafter the new device is married to the system in which it has been initialized. (Optionally, administrators can be given access to the site code, and the protected peripheral can be programmed to allow its authentication code to be cleared if the proper site code, verified by the authentication code, is first presented as a password.)

The hardware requirements are fairly simple. The innovative architecture merely requires the implementation of a small amount of memory and an inexpensive microprocessor or state controller integral to the item needing protection.

Increased technical support operation costs as a result of using incompatible components can be reduced by utilizing a device certification scheme where the manufacturer informs the user of compatibility issues during POST. In an alternative embodiment, when an uncertified device is installed into a system, the device serial number and signature triggers code in the POST program which displays a message to the user informing them of the potential problem. Problems are resolved more quickly, without necessarily involving the manufacturer's technical support staff.

One advantage is that it provides a way to identify a system as coming from a particular manufacturer. Repackaging of a used system into a different new or third-party case can be detected more readily when systems are encoded with manufacturer-specific numbers.

In the simplest case, the site code is simply the computer system's serial number. However, the authentication can optionally be made dependent on a "site code" which is shared by more than one system. The site code can be a system-specific identifier, or can be allocated per-LAN, per-cluster, per-building, per-campus, per-division, or per-company. The use of a shared site code permits components to be freely interchanged within the same "site code" zone, which adds to convenience. (Of course in this case the machines which share a common site code need appropriate programmation so that the site code will be fetched by their POST routines.)

If authentication is unsuccessful, component operation can be disabled or crippled in several ways. For example, hard disks can be locked out in accordance with the ATA constraints mentioned above. Alternatively, the present embodiment can be used with a constraint in which the only permitted disk operation is low level formatting. This at least precludes a thief from obtaining information from the drive.

In theory, it will still be possible to use data recovery methods to extract the information from the disk, and thus this system, by itself, will not be foolproof against a determined espionage attempt in which a computer is stolen to obtain the information stored on it. However, by raising the price for data recovery, the chance is reduced that a thief will casually steal a disk which contains important data, and then learn from the data that there may be a potential illegal buyer, and then contact that buyer.

Another advantage is that it provides an indirect methodology for protecting individual components within the system from theft. It accomplishes this by removing the gray-market resale value of the component by restricting the ability of an unauthorized person or system to use the device.

Another advantage is the ability to identify legitimate vendor components to prevent warranty fraud. Any installed component identified as a non-warranty item may be declined service and those identified as not coming from that particular manufacturer will be declined warranty service.

BRIEF DESCRIPTION OF THE DRAWINGS

The disclosed inventions will be described with reference to the accompanying drawings, which show important sample embodiments of the invention and which are incorporated in the specification hereof by reference, wherein:

FIG. 4 shows a flowchart for component verification of first-time device installs.

DETAILED DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 2:
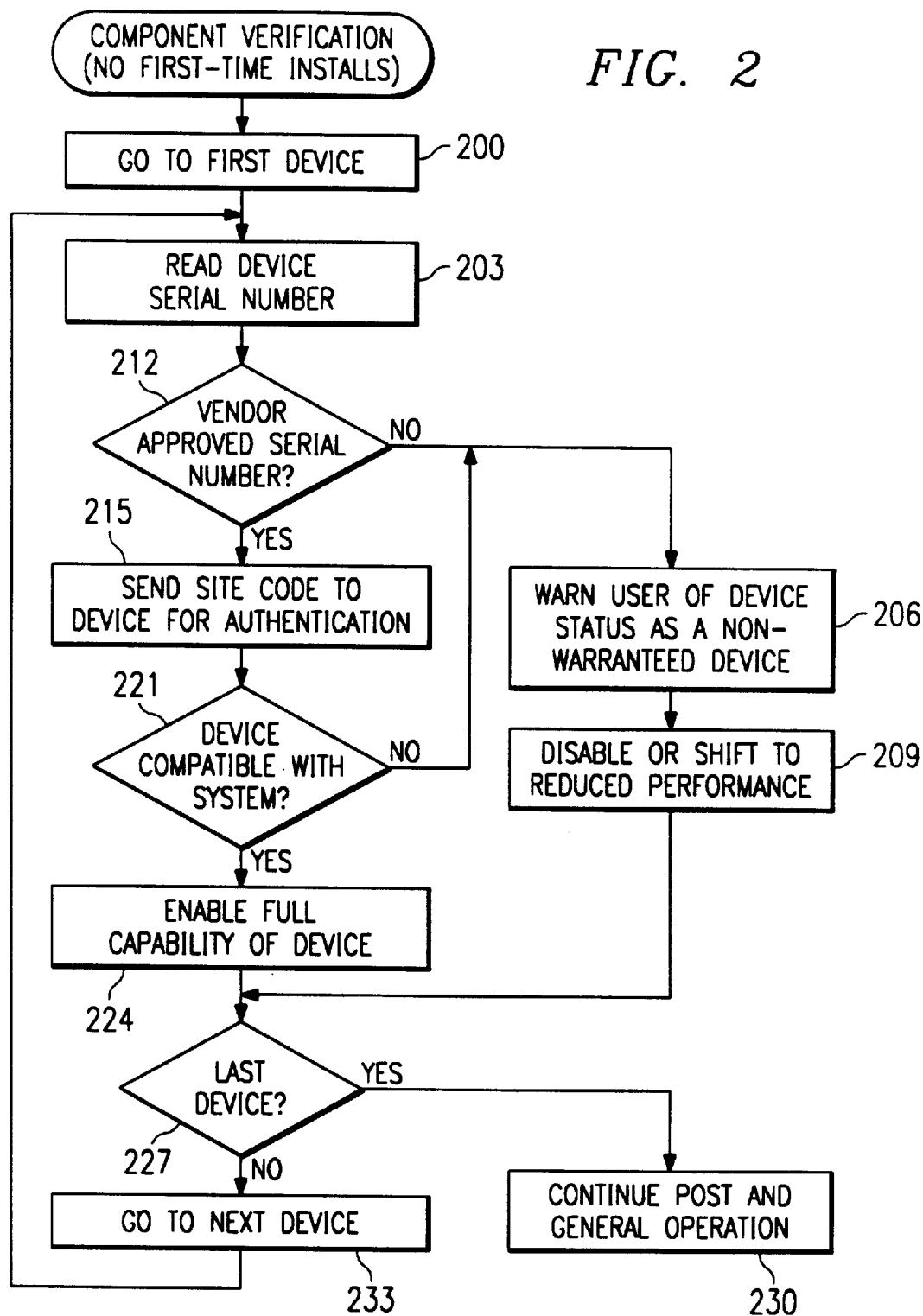
FIG. 2 shows a flowchart for making typical device integrity checks using the theft protection scheme during POST.

FIG. 2 shows a flowchart of typical device integrity checks using the theft protection scheme of the present application during the POST procedure. It should be noted that after the first-time installation of an authorized device, two numbers are stored on the device: an encoded number based upon the device serial number, and the device serial number. Upon power-up of the system, validity checks occur based upon these two numbers. (This flowchart does not include the instance where a newly-installed and authorized device is added to an existing system and requires an initial encoding process, but focuses only on the instance where all devices have already passed the first-time encoding process.)

When the POST begins execution, the first device is detected in step 200 and its serial number is read, as in step 203. (This is done during the bus discovery phase after a system reset.) If in optional step 212 the serial number indicates that the device is not made by that vendor, execution branches to optional step 206 where a warning is displayed to the user to the effect that the device is an unauthorized or non-warranty device. As a result of using an unauthorized device, program flow moves to step 209 where device operation may be shifted into a mode of lower performance, or may be totally disabled. If the device serial number indicates an approved vendor device, the site code is sent to the device (step 215). Logic in the device then checks this site code against the stored authentication code. If the device is determined to be incompatible with the system, execution is passed to steps 206 and 209 for warnings and system performance restrictions as previously mentioned. If the device is an approved device for that system, the device is enabled for full operation with all of the designed enhancements, as indicated in step 224. The integrity process continues (as indicated in steps 227 and 233) so that all devices are checked. When the last device is checked, the POST process finishes and branches to bring the system into operation based upon the success or failure of the validity checks of the devices of the system, as indicated in step 230.

FIG. 4 shows a flowchart for component verification of first-time device installs. Prior to the first-time installation of a protectable device, only the serial number is stored on the device. After the initialization process, the device will retain both the serial number and an authentication code derived from the serial number in combination with the site code of the system where it is installed. The user first installs the device and powers-up the system. The device serial number is read by the system CPU, as in step 400 (or optionally, the embedded device microcontroller). In optional step 403, the system performs a validity check of the device's serial number to ascertain if the device is an approved vendor device. If the device is an authorized device but does not contain any authentication code, the system CPU generates an authentication code from the device serial number in combination the site code (step 406). In step 412, the authentication code is then passed back to the device, and stored in nonvolatile memory on the device. If the device is not an approved component, program flow moves to optional step 409 where a message is displayed to the user indicating that the device is unapproved for use in the system. After the component has undergone successful validation and encoding, the full capabilities of the device are enabled, in step 415, and the POST process continues in step 418.

Sample System Embodiment

Figure 3:
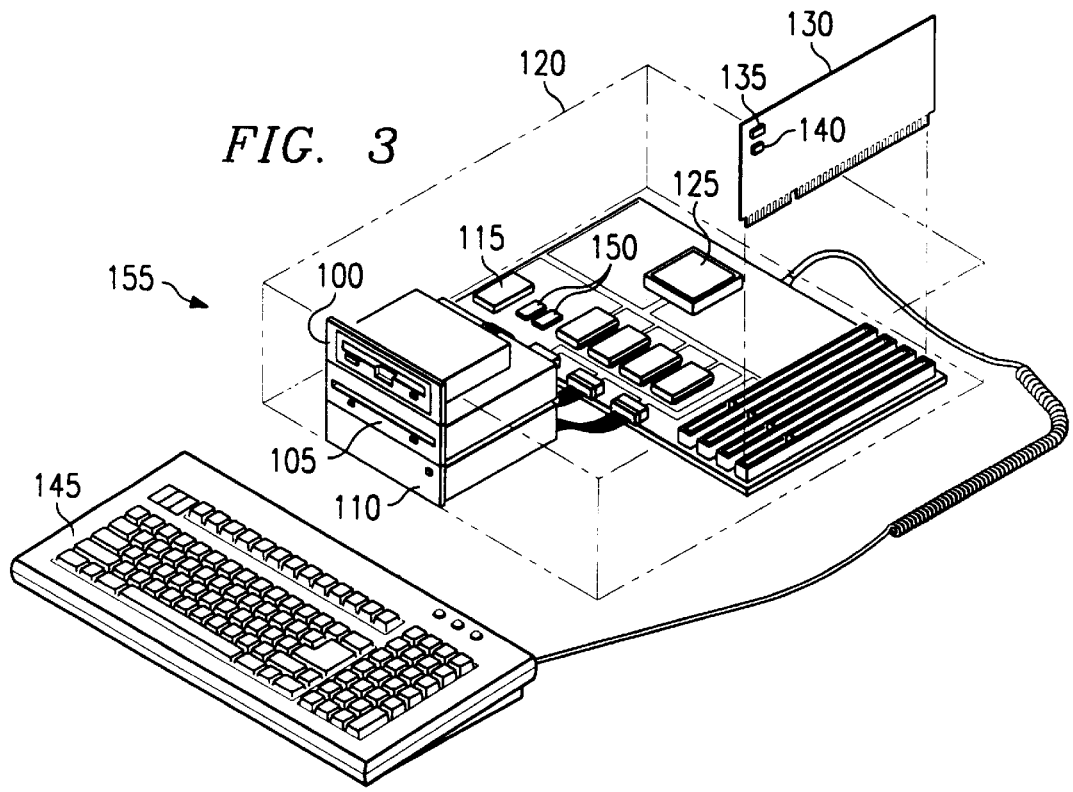
FIG. 3 shows insertion of a new computer card containing the innovative theft protection technology into a computer system.

FIG. 3 schematically shows insertion of a computer card containing the innovative theft protection technology into a computer system 155. A computer card 130 is inserted into the backplane of a system board 120. The card 130 contains a microcontroller or state machine 135 that can access a small amount of nonvolatile memory 140 which contains the encoded password of a particular manufacturer. The computer may also contain other peripheral components designed with the theft protection equipment. For example, a hard disk drive 110 that provides mass storage capability is a primary candidate for the feature. With the rapid advances in mass storage capability and the ever increasing storage requirements for software, hard drives are swapped into old and new computer systems on a regular basis and can be easily removed from a computer in a very short period of time.

Similarly, a floppy drive (or other removable media drive) 105 is a common peripheral in most computers, but is becoming less useful with the pervasiveness of CD-ROMs 100 in computers sold today. In an alternative embodiment, it is contemplated that a central processing unit ("CPU") 125 itself also contains the innovative theft protection feature, so that the CPU 125 may only operate within the component confines of a particular manufacturer's system. In this particular representation, a non-volatile memory 115 stores the POST code for the computer system 155. Upon power-up, the POST code is moved from non-volatile memory 115 into a faster RAM 150. The POST is executed in sequence according to FIG. 2 which includes the theft protection embodiment. The POST procedure eventually checks the existence and integrity of all internal and external peripheral devices including the keyboard 145.

Figure 1:
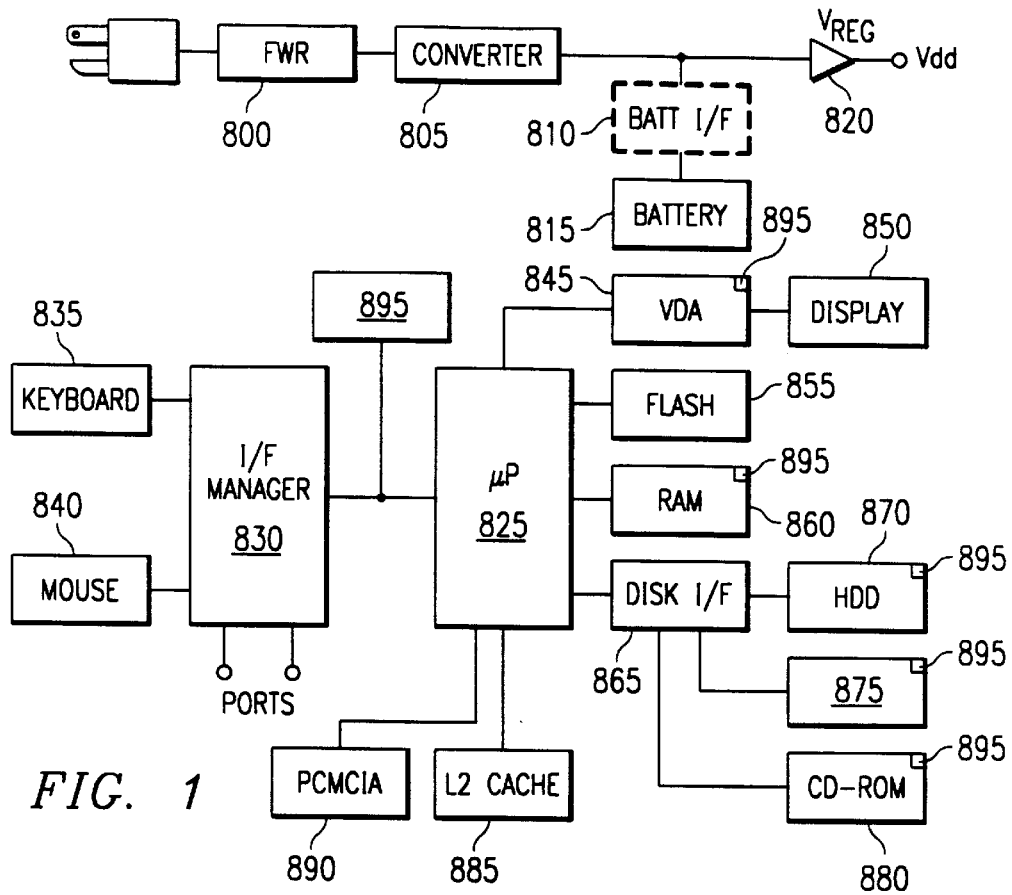
FIG. 1 shows a block diagram of a portable computer system according to the presently preferred embodiment.

FIG. 1 shows a portable computer which can use the innovative theft protection method. The system includes a power converter 805 which is used to charge a battery 815. Optionally, a battery interface 810 is interposed between the battery and the rest of the circuitry. The power converter 805 is connected, through a full-wave bridge rectifier 800, to draw power from AC mains, and is connected to provide a DC voltage to the battery 815. The battery 815 (or the converter 805), connected through a voltage regulator 820, is able to power the complete portable computer system, which includes in this example:

user input devices (e.g. keyboard 835 and mouse 840);
at least one microprocessor 825 which is operatively connected to receive inputs from said input device, through an interface manager chip 830 (which also provides an interface to the various ports);

a memory (e.g. flash memory 855 and RAM 860), which is accessible by the microprocessor;

a data output device (e.g. display 850 and video display adapter card 845) which is connected to output data generated by microprocessor; and a magnetic disk drive 870 which is read-write accessible, through an interface unit 865, by the microprocessor.

Optionally, of course, many other components can be included, and this configuration is not definitive by any means. For example, the portable computer may also include a CD-ROM drive 880, and/or a removable media drive 870, which may interface to the interface controller 865. Additionally, L2 cache 885 may be added to speed data access from the disk drives to the microprocessor, and a PCMCIA 890 slot accommodates peripheral enhancements. Many of the aforementioned components may be designed to contain the innovative theft protection circuitry 895.

Further Background

The following is a detailed prior art POST procedure as published by AMI, and is typical of many present-day computer systems. This helps to show the overall context of the flowcharts of FIGS. 2 and 4.

1. Determine density and type of SIMMs.
2. Shadow system BIOS (System BIOS on the flash is copied to main memory).
3. Initialize interrupt controllers and chip sets.
4. Test CPU resisters.
5. Size L2 cache.
6. Test CMOS.
7. Test and initialize CMOS.
8. Test DMA channels.
9. Verify if refresh is running.
10. Test base 64K of memory.
11. Determine total memory size.
12. Initialize keyboard controller.
13. Detect presence of external Video controllers.
14. Configure PCI video, set monitor refresh rates and size video memory.
15. Display Banner.
16. Reset Keyboard.
17. Test memory above 64K, base and extended (memory count).
18. Flush and enable L2 cache.
19. Initialize serial and parallel port controllers.
20. Initialize floppy controller and seek for floppy drives specified in CMOS.
21. Reset Mouse.
22. Initialize hard disk subsystem. Determine type and size of IDE drives.
23. Run Plug and Play code.
24. Beep signifying end of POST.
25. Boot to OS on bootable media.

POST also normally includes an option for the user to initiate a configuration program known as SETUP. SETUP permits the user to update the CMOS values for date, time, and drive types, and may include many other configuration options as well.

After POST, a "bootstrap" program is run, to permit the CPU to begin execution of other software. For robustness, the POST and bootstrap software is normally stored in a read-only memory. The bootstrap program launches the CPU on execution of the primary operating system software (from disk); the primary operating system can then be used by the user to launch an application program, either manually or automatically.

The "basic input/output system" ("BIOS") software contains frequently-used routines for interfacing to key peripherals, for interrupt handling, and so forth. For system robustness, the BIOS software itself is normally packaged in nonvolatile memory with other key pieces of overhead software, such as POST, boot, and configuration management routines, as well as a pointer to launch the computer into the operating system software. (Thus, the term BIOS is often used more broadly, to refer to this whole collection of basic system routines in ROM or EPROM.)

According to a disclosed class of innovative embodiments, there is provided: A method of theft protection, comprising the steps of: (a.) when a system is powered up, sending a site code, which at least partially identifies said system, to one or more protected components connected to said system; and (b.) in a protected component which contains memory space reserved for a unique authentication code which is not the same as the component's serial number: if said memory space contains an authentication code, testing said site code against said authentication code by a digital verification test, and enabling full operation of said component only if said testing is successful; and if said memory space does not contain said authentication code, then generating said authentication code by digitally combining said site code with a unique serial number which is readably stored in nonvolatile memory on said component, and storing said authentication code in said memory space.

According to another disclosed class of innovative embodiments, there is provided: A method of theft protection in a computer system which includes a memory, at least one processor unit, a non-volatile storage unit, a user input, and a user output, comprising the steps of: (a.) sending a site code from said processor unit to at least one protected component at power up; (b.) testing said site code, in combination with a unique serial number of said protected component, against a stored authentication code, in a digital verification test; and (c.) enabling full performance of said component only when said testing (b.) is successful.

According to a disclosed class of innovative embodiments, there is provided: A method of configuration control in a computer system which includes a memory, at least one processor unit, a nonvolatile storage unit, a user input, and a user output, comprising the steps of: (a.) reading a unique number from at least one protected component connected to said computer system; (b.) testing said unique number, in combination with a site code which at least partially identifies said system, against a stored authentication code which is different from said site code and from said unique number, using a digital verification test; and (c.) enabling full performance of said component in partial dependence on the outcome of said testing step (b.).

According to another disclosed class of innovative embodiments, there is provided: A computer system, comprising: a plurality of components comprising a memory, a system CPU, a non-volatile storage unit, a user input, and a user output; wherein at least one said component comprises a microcontroller; first and second unique numbers stored in readable memory locations; wherein said first unique number uniquely identifies said component, and said second unique number is derived both from said first unique number, and also from a site code which at least partially identifies the system, in a predetermined transformation relationship; and wherein said microcontroller is programmed to digitally authenticate a system site code whenever a full power-up initialization occurs, using said second unique number, and in dependence thereon to enable full performance of said component.

According to a disclosed class of innovative embodiments, there is provided: A component, comprising: a microcontroller; a first unique number nonvolatilely stored at a readable address; and a nonvolatile memory operatively connected to said microcontroller; wherein upon first power-up in a system which provides a site code to said component, said microcontroller writes to said memory a second unique number which is not equal to said first unique number, and which is derived from said first unique number by a digital transformation which is dependent on said site code.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

In alternative embodiments, the CPU (or a system management microcontroller on the system board) can also perform digital authentication checks at POST, to ensure that all of the peripherals present are authenticated. Depending on customer preferences, this check can be used to reject or downgrade unapproved peripherals. Alternatively, this check can be used to require a system administrator password authorization before any new protectable component is installed into a system.

In another alternative embodiment, a full digital signature verification can be performed, instead of the simpler test of the presen preferred embodiment. This requires a public key for each component, and a small amount of logic (e.g. a few hundred gates or an 8-bit microcontroller).

In another alternative embodiment,, a command to restore the original state of the component can be allowed as a protected command (subject to authentication as describe above).

In the foregoing embodiments, the absence of any data in the space reserved for the authentication code is used to indicate that a protectable component may be installed into another system. (Thus "000000 . . . " is effectively a reserved value of the authentication code.) However, alternatively a different reserved value can be stored at the memory space reserved for the authentication code, to indicate that no authentication code is present.

In the sample computer system embodiment the user input devices can alternatively include a trackball, a joystick, a joystick, a 3D position sensor, voice recognition inputs, or other inputs. Similarly, the output devices can optionally include speakers, a display (or merely a display driver), a modem, or other outputs.

For example, as will be obvious to those skilled in the art, the innovative security architecture may be employed not only in stationary computer systems, but also in portable systems as well.

It should also be noted that the disclosed innovative ideas are not by any means limited to systems using a single-processor CPU, but can also be implemented in computers using multiprocessor architectures.

It should also be noted that the disclosed innovative ideas are not by any means limited to single-user desktop systems, but are also applicable to network servers, mainframe transaction processing systems, terminals, engineering workstations, and portable computers to which an external keyboard can be attached.

To protect against difficulties caused by users accidentally triggering lockout relationships, there will typically be up to four layers of passwords: a user password which must be entered at power-on; an administrator password; optionally, a workgroup password; and an emergency-access password. In an alternative embodiment, the administrator password may be required for the initial imprinting step during the first-time install of a component.

What is claimed is:

1. A method of theft protection, comprising the steps of:
   (a.) when a system is powered up, sending a site code, which at least partially identifies said system, to one or more protected components connected to said system; and
   (b.) in a protected component which contains memory space reserved for a unique authentication code which is not the same as the component's serial number:
      if said memory space contains an authentication code, testing said site code against said authentication code by a digital verification test, and enabling full operation of said component only if said testing is successful; and
      if said memory space does not contain said authentication code, then automatically generating said authentication code by digitally combining said site code with a unique serial number which is readably stored in nonvolatile memory on said component, and storing said authentication code in said memory space.

2. The method of claim 1, wherein said component is hot-pluggable, and said steps (a.) and (b.) are also performed when said component is undergoing device self-testing after hotplug insertion.

3. The method of claim 1, wherein said site code is the unique serial number of said system.

4. The method of claim 1, wherein said digital verification test is a public-key/private-key digital signature verification test.

5. The method of claim 1, wherein a system CPU is programmed to perform said test.

6. The method of claim 1, wherein a microcontroller located on said new component is programmed to perform said testing.

7. The method of claim 1, wherein a microcontroller located on said new component is programmed to perform said testing and said microcontroller is a state machine.

8. A method of theft protection in a computer system which includes a memory, at least-one processor unit, a non-volatile storage unit, a user input, and a user output, comprising the steps of:
   (a.) sending a site code from said processor unit to at least one protected component at power up;
   (b.) testing said site code, in combination with a unique serial number of said protected component, against a stored authentication code, in a digital verification test; and
   (c.) enabling full performance of said component only when said testing (b.) is successful.

9. The method of claim 8, wherein said testing is performed by a microcontroller on said component.

10. The method of claim 8, wherein said digital verification test is a public-key/private-key digital signature verification test.

11. The method of claim 8, wherein said site code is the unique serial number of said system.

12. The method of claim 8, wherein said component is hot-pluggable, and said steps (a.) and (b.) are also performed when said component is undergoing device self-testing after hot-plug insertion.

13. A method of configuration control in a computer system which includes a memory, at least one processor unit, a non-volatile storage unit, a user input, and a user output, comprising, the steps of:

(a.) reading a unique number from at least one protected component connected to said computer system;

(b.) testing said unique number, in combination with a site code which at least partially identifies said system, against a stored authentication code which is different from said site code and from said unique number, using a digital verification test; and (c.) enabling full performance of said component in partial dependence on the outcome of said testing step (b.).

14. The method of claim 13, wherein said unique number is a serial number of said component.

15. The method of claim 13, wherein said testing is performed by said processor unit.

16. The method of claim 13, wherein said digital verification test is a public-key/private-key digital signature verification test.

17. The method of claim 13, wherein said component is hot-pluggable, and said steps (a.) and (b.) are also performed when said component is undergoing device self-testing after hot-plug insertion.

18. The method of claim 13, wherein said testing is performed both by said processor unit and also, independently, by a programmable processor which is part of said component.

19. The method of claim 13, ;herein said site code is the unique serial number of said system.

20. A computer system, comprising:

a plurality of components comprising a memory, a system CPU, a nonvolatile storage unit, a user input, and a user output;

wherein at least one said component comprises
a microcontroller;
first and second unique numbers stored in readable memory locations;
wherein said first unique number uniquely identifies said component, and said second unique number is derived both from said first unique number, and also from a site code which at least partially identifies the system, in a predetermined transformation relationship;

and wherein said microcontroller is programmed to digitally authenticate a system site code whenever a full power-up initialization occurs, using said second unique number, and in dependence thereon to enable full performance of said component.

21. The system of claim 20, wherein said CPU is programmed to digitally authenticate during a Power-On-Self-Test procedure.

22. The system of claim 20, wherein said site code is the unique serial number of said system.

23. The system of claim 20, wherein said first unique number is the serial number of said component.

24. The system of claim 20, wherein said memory is a non-volatile memory.

25. The system of claim 20, wherein said microcontroller is implemented by a state machine.

26. The system of claim 20, wherein said microcontroller is programmed to enable operation of said component by way of a latching device.

27. A component, comprising:

a microcontroller;

a first unique number nonvolatilely stored at a readable address; and a nonvolatile memory operatively connected to said microcontroller;

wherein upon first power-up in a system which provides a site code to said component, said microcontroller writes to said memory a second unique number which is not equal to said first unique number, and which is derived from said first unique number by a digital transformation which is dependent on said site code.

28. The component of claim 27, wherein said site code is the unique serial number of said system.

29. The component of claim 27, further comprising a rotatable magnetic storage medium.

* * * * *